United States Patent [19]

Buford

[11] 4,445,428
[45] May 1, 1984

[54] COOKING GRILL HEATED FROM DEEP FAT FRYER

[76] Inventor: J. Philip Buford, 513 N. Boston Ave., De Land, Fla. 32720

[21] Appl. No.: 439,024

[22] Filed: Nov. 3, 1982

Related U.S. Application Data

[63] Continuation-in-part of Ser. No. 249,937, Apr. 1, 1981, abandoned.

[51] Int. Cl.³ ............................................ A47J 37/00
[52] U.S. Cl. ........................................ 99/340; 99/403; 99/422; 99/447; 126/390; 165/104.21
[58] Field of Search ................. 165/47 H, 104.21; 99/339, 340, 403, 422, 401, 447, 448, 449; 219/454, 430, 439, 462; 126/378, 382, 390

[56] References Cited

U.S. PATENT DOCUMENTS

| | | | |
|---|---|---|---|
| 1,146,310 | 7/1915 | Colby | 219/462 |
| 1,330,868 | 2/1920 | Harrison | 99/403 |
| 1,530,224 | 3/1925 | Baer | 99/425 X |
| 2,128,738 | 8/1938 | Blake | 99/403 |
| 2,204,699 | 6/1940 | Robertson | 99/448 |
| 2,429,282 | 10/1947 | Van Ness | 99/340 |
| 2,772,978 | 12/1956 | Shaw | 99/403 X |
| 2,835,480 | 5/1958 | Perez | 165/104.21 |
| 3,763,846 | 10/1973 | Schantz | 99/340 |
| 3,793,936 | 2/1974 | Wills | 99/339 |
| 3,815,575 | 6/1974 | Davis | 219/439 |
| 3,837,270 | 9/1974 | Cooper | 99/422 X |
| 4,009,417 | 2/1977 | Waldon | 165/104.21 |
| 4,245,147 | 1/1981 | Cummings | 126/390 X |

FOREIGN PATENT DOCUMENTS

| | | | |
|---|---|---|---|
| 26136 | of 1903 | United Kingdom | 99/445 |
| 240582 | 10/1925 | United Kingdom | 99/422 |

*Primary Examiner*—Billy J. Wilhite
*Attorney, Agent, or Firm*—Haight, Hofeldt, Davis & Jambor

[57] ABSTRACT

A cooking grill structure for utilizing the heat from deep fat fryers has a grill plate and a heat pipe extending into the cooking oil. Water is utilized as the liquid medium in the heat pipe, and condensation is distributed over the grill plate to provide uniform heating and prevent accumulated forces. Distribution is achieved by a relatively small channel that uniformly spreads the heat while preventing the production of unduly large pressure forces. To achieve greater transfer of heat from the cooking oil to the liquid medium in the heat pipe, heat transfer assistance approaches, such as fins or small diameter tubes to provide a flash boiler effect may be used. Also, more than one heat pipe may be used, and the grill plates may be interlocked to provide a continuous grill surface.

12 Claims, 5 Drawing Figures

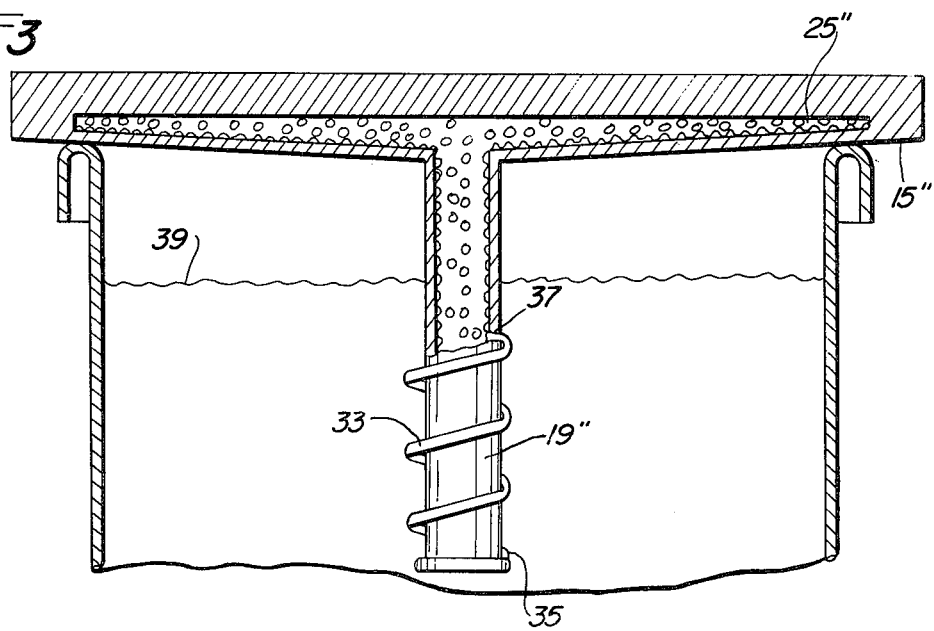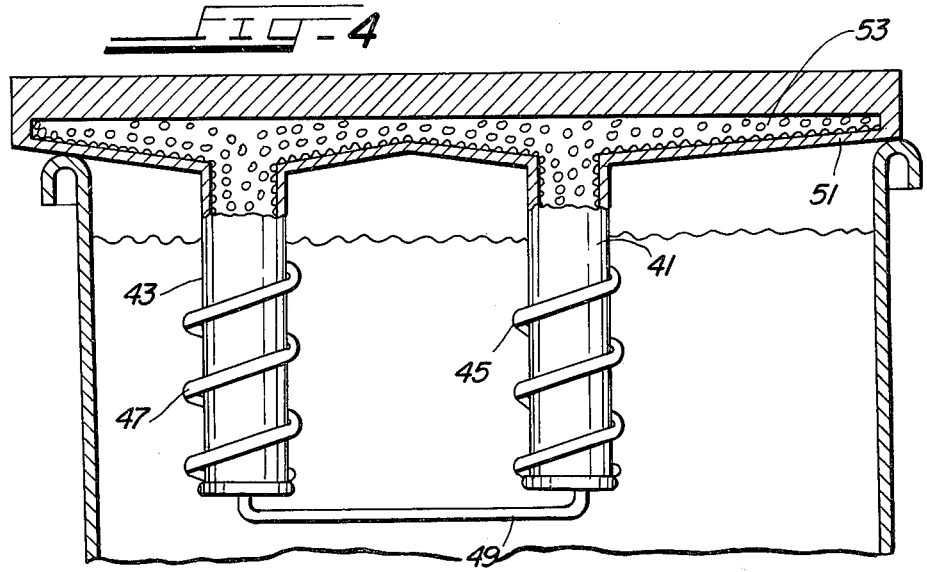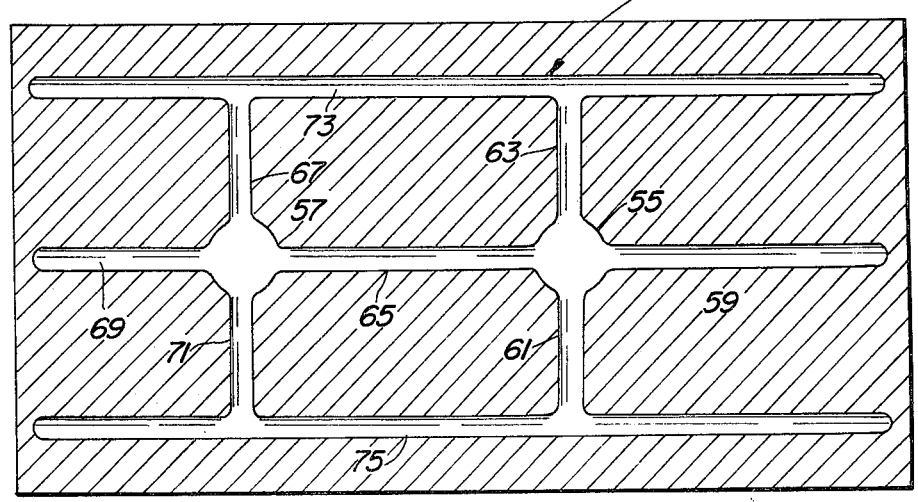

COOKING GRILL HEATED FROM DEEP FAT FRYER

CROSS-REFERENCE TO RELATED APPLICATION

This application is a continuation-in-part of U.S. Pat. application Ser. No. 06/249,937, filed on Apr. 1, 1981 by J. Philip Buford, for "Cooking Grill Heated From Deep Fat Fryer" now abandoned.

BACKGROUND OF THE INVENTION

1. Field of the Invention

This invention relates generally to a cooking grill, and more specifically, this invention relates to a cooking grill heated from a deep fat fryer.

2. Description of the Prior Art

Fast-food facilities normally have deep fat fryers to cook items such as french fries. Also, foods such as hamburgers are now frequently cooked by devices such as chain conveyor broilers or charcoal grills, rather than a general purpose grill. While this approach works well for these foods, there are various types of foods, such as eggs, that are not readily susceptible to cooking by such devices. Thus, some fast-food facilities are limited in the types of food and the meals that they can serve. For example, they may find it difficult to provide a full range of breakfast foods, which limits the usefulness of their facility.

Separate grills could be provided, but this involves additional cost and space, with the attendant increase in capitalization and overhead expense. Also, the grills might be utilized only for a portion of the day. A preferable approach would be to utilize the available heat source (i.e., the deep fat fryers) to provide a heated grilling surface when required. Since the peak time usages for the deep fat fryers (e.g., lunch time or supper time) normally differs from the peak time usage of the grills (e.g., breakfast, when the deep fat fryers would not usually be required), this would provide a very desirable combination that would tend to maximize utilization of these components. Specifically, the deep fat fryers may be utilized as a heat source for the grills at breakfast. Further, since the cooking oil in the deep fat fryers must usually be kept heated for possible use, the heat lost when they were not in use could be put to work.

Two previous attempts to provide such a deep fat fryer grill have been made. One involves placing a grill plate on top of the deep fat fryer and increasing the temperature of the cooking oil to grill by heat radiated from the cooking oil. The other utilizes a grill plate floating directly on the cooking oil. Each of these attempts has defects that prevents successful use.

In connection with the first, the increased temperature of the cooking oil causes it to degrade (i.e., particles of the oil carbonize). This results in a lower smoking temperature that causes foods cooked in that oil to have an undesirable taste and smell. Also, of course, the increased temperature requires greater energy consumption.

With respect to the second approach, the cooking oil must be kept below the top of the vat or container, so that the insertion of food to be cooked does not cause the cooking oil to overflow. Thus, the grill plate must be small enough to be inserted into the top of the deep fat fryer. This reduces grill surface and prevents the joinder of adjacent grill plates. Further, the grill surface is not maintained flat as the grill plate floats on the cooking oil.

Accordingly, it would be highly desirable to have an effective system for converting a deep fat fryer into a grill.

SUMMARY OF THE INVENTION

With the present invention, a relatively lightweight grill system is provided by which a deep fat fryer can be easily converted for grilling and re-converted for deep fat frying.

This system includes a generally flat grill plate that is arranged to be mounted on top of the deep fat frying vat or container. In a preferred form, the grill plate could rest directly on the top of the deep fat frying container.

Heat for the grill plate is obtained from the heated cooking oil by an appropriate heat transfer arrangement. This could take various forms, such as a solid heat conducting structure, but the preferred approach disclosed herein utilizes a heat pipe that extends from the grill plate down into the cooking oil. With such a heat pipe, a liquid medium, such as water, is vaporized by heat from the cooking oil and then condensed adjacent the grill plate to provide the heat for cooking. A distributing structure may be utilized to spread the heat of condensation evenly over the grill plate, and preclude development of excessive forces on the grill plate. The distributing structure may take the form of a channel having a multiplicity of branches distributed under the grill plate, so that a branch of the channel is in relatively close proximity to a major portion of the surface of the grill plate. This distributing structure should be slightly evacuated to prevent an air layer from interfering with heat transfer to the grill plate.

In order to increase heat transfer for the cooking oil to the heat pipe, heat fins may be located on the portion of the heat pipe that extends into the cooking oil. Alternatively, a relatively small diameter tube may be connected to the heat pipe to provide a flash boiler effect, and thus greatly enhance the heat transfer characteristics. Also, additional interconnected heat pipes, each with a flash boiler tube, may be used to increase heat transfer from the cooking oil to the grill plate.

Each of the grill plates may be provided with a converting structure that permits grill plates mounted on adjacent deep fat fryers to be interlocked to provide a continuous grill surface. This provides a large grill surface, when required, with considerable efficiency.

These and other objects, advantages and features of this invention will hereinafter appear, and for purposes of illustration, but not of limitation, exemplary embodiments of the subject invention are shown in the appended drawings.

BRIEF DESCRIPTION OF THE DRAWINGS

FIG. 3 is a side elevational view, partially broken away, of another embodiment of a cooking grill constructed in accordance with the present invention utilizing a flash boiler tube.

FIG. 4 is a side elevational view of another embodiment of a cooking grill constructed in accordance with the present invention utilizing multiple heat pipes.

FIG. 5 is a schematic view of the cooking grill of FIG. 4 illustrating the shape of the distributing channel.

DETAILED DESCRIPTION OF THE PREFERRED EMBODIMENT

Figure 1:
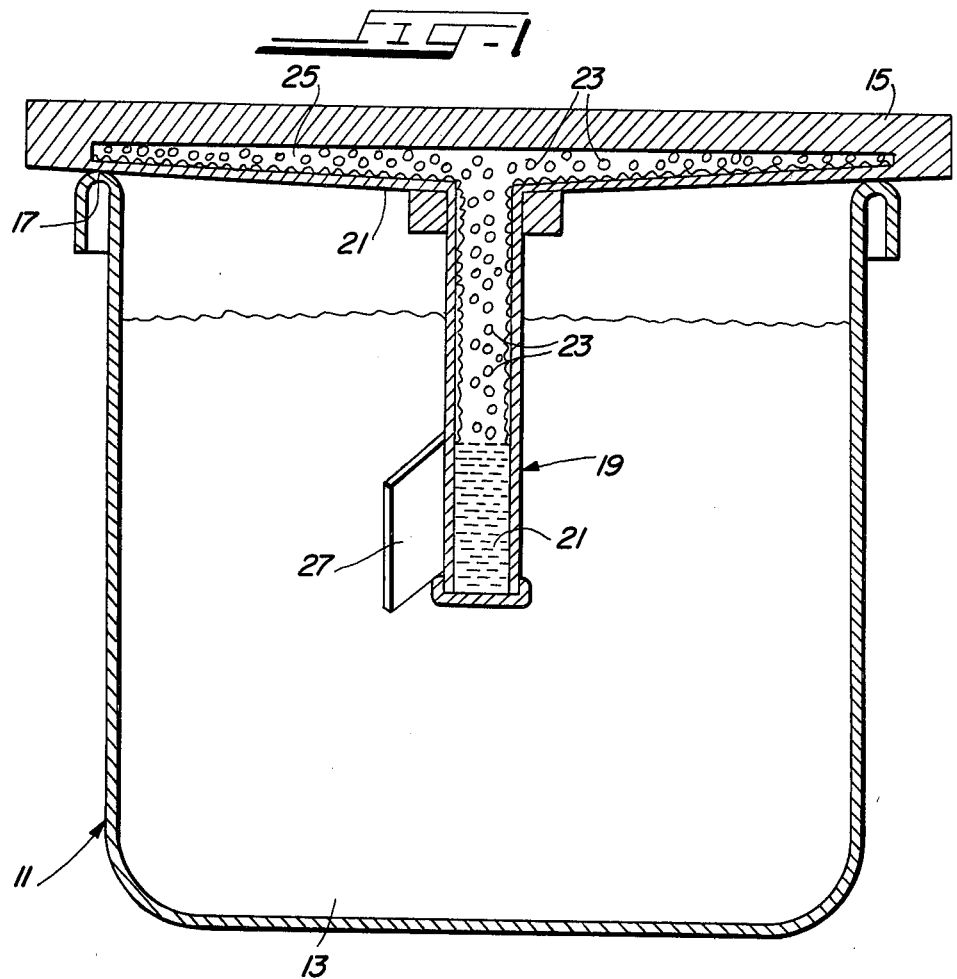
FIG. 1 is a cross-sectional view of a deep fat fryer with a cooking grill constructed in accordance with the present invention.

A deep fat frying container 11 is illustrated in FIG. 1. Deep fat frying container 11 is partially filled with a cooking oil 13. Cooking oil 13 is kept at a raised temperature, generally in the 350°-400° Fahrenheit range, for cooking french fried potatoes or other foods immersed therein.

To provide a cooking grill heated from the cooking oil 13, a grill plate 15 is appropriately mounted on the deep fat fryer 11. In this preferred embodiment, the grill plate 15 may be mounted directly on the top 17 of the container 11.

A heat pipe 19 is appropriately secured to the bottom of grill plate 15 to extend down into the cooking oil 13. Heat pipe 19 is filled with a suitable liquid medium 21, such as freon, alcohol, oil of turpentine or water. In this preferred embodiment, water is utilized for purposes of safety as well as efficacy.

In operation, heat from the cooking oil 13 vaporizes the liquid medium 21, the vapor being represented by bubbles 23. The vapor 23 rises to a distributing chamber or channel 25. Vapor 23 condenses in channel 25, and the heat of condensation provides the cooking heat for grill plate 15. Channel 25 is constructed to evenly distribute the heat over the surface of grill plate 15 and to prevent the development of cumulative forces at a given area. Channel 25 is also partially evacuated to prevent an air barrier from being created that could interfere with the transfer of heat to grill plate 15. In addition, to increase heat transfer from the cooking oil to heat pipe 19, heat fins 27 may be attached to heat pipe 19.

Figure 2:
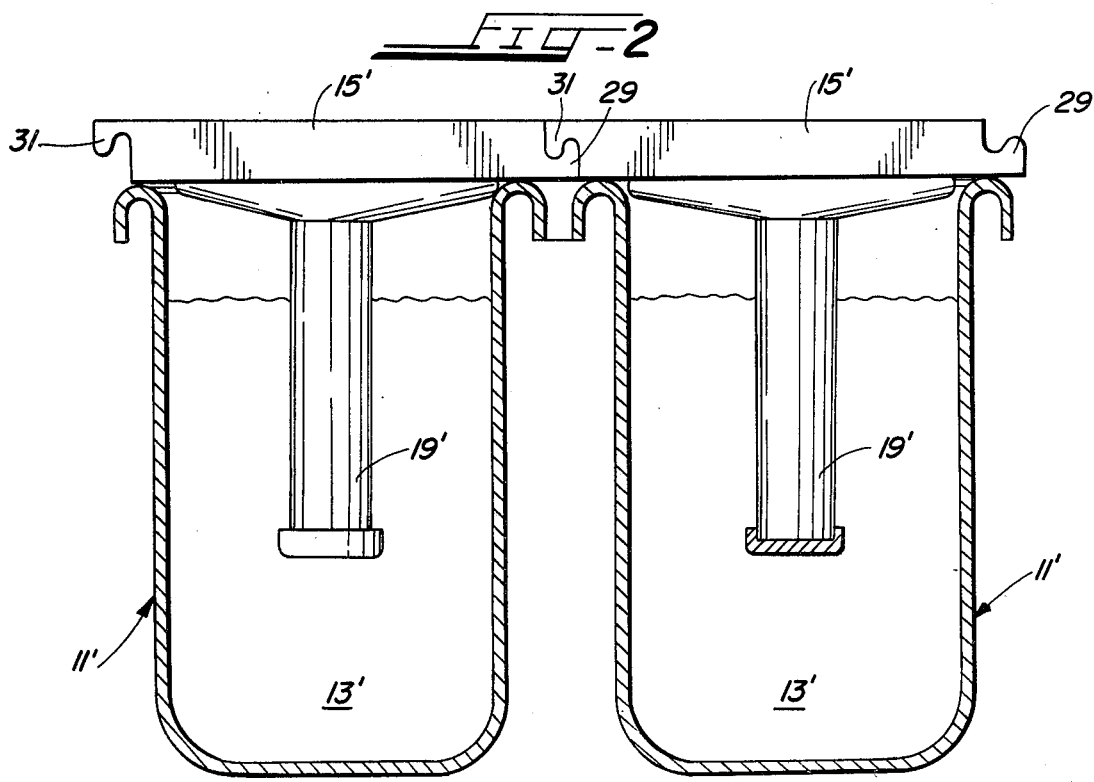
FIG. 2 is a cross-sectional view showing multiple deep fat fryers with another embodiment of cooking grills constructed in accordance with the present invention.

FIG. 2 illustrates another embodiment in which grill plates 15' are provided with connecting elements 29 and 31. When elements 29 and 31 are mated, a continous grill surface heated from adjacent deep fat fryers 11' is provided. Any appropriate form of a connecting structure may be utilized, and the grill surface can extend along as many deep fat fryers as desired or needed.

To increase the efficiency of heat transfer from the cooking oil to the heat pipe, an arrangement such as that illustrated in FIG. 3 may be utilized. In this embodiment, a tube 33 is associated with the heat pipe 19", such as by being wrapped around it. A first end 35 of tube 33 is connected in fluid communication with the interior of heat pipe 19" at the bottom thereof to provide for flow of the liquid medium from the heat pipe 19" into the tube 33.

An end 37 of tube 33 is connected to heat pipe 19" at a point, preferably although not necessarily, below the surface of the cooking oil, represented by the wavy line 39. End 37 of tube 33 is also preferably, although not necessarily, located above the level of the liquid medium in heat pipe 19". As in the case of end 35, end 37 of tube 33 is in fluid communication with the interior of heat pipe 19".

Due to the communication between heat pipe 19" and tube 33, the liquid medium in heat pipe 19" tends to rise to the same level in tube 33 that it reaches in heat pipe 19". However, since the tube 33 has a diameter small in comparison to the diameter of heat pipe 19", heat transfer from the cooking oil to the relatively small amount of liquid medium in tube 33 rapidly raises the temperature of the liquid medium. The result is that the liquid medium in tube 33 is quickly vaporized, and thus tube 33 provides a flash boiler effect.

Upon vaporization in flash boiler tube 33, the vaporized medium passes back into heat pipe 19" for conveyance to distributing channel 25". Although the discharge of vaporized medium into heat pipe 19" normally is above the level of the liquid in the heat pipe, even if the level of the liquid were to rise above end 37 of the flash boiler tube 33, the operation of the system should not be significantly affected.

By utilizing the small dimensions of the tube 33 to achieve a flash boiler effect, the process of heat transfer from the cooking oil to the liquid medium in the heat pipe 19" is greatly accelerated. As the vaporized medium condenses and conveys heat to the grill plate 15", the condensed liquid is returned to heat pipe 19" and, in part, to the flash boiler tube 33 to once again be vaporized.

It is not necessary that only one heat pipe be used with the grill plate, as a multiplicity of such heat pipes could be employed in various situations. Thus, in FIG. 4 there is illustrated another embodiment utilizing two heat pipes 41 and 43. Heat pipes 41 and 43 are essentially the same as heat pipe 19 and utilize a common liquid medium.

Heat pipes 41 and 43 are provided with flash boiler tubes 45 and 47, respectively. Flash boiler tubes 45 and 47 are essentially identical to flash boiler tube 33.

In order to prevent an accumulation of liquid medium in one or the other of heat pipes 41 or 43, the bottoms of these heat pipes are interconnected by a tube or conduit 49. Not only does conduit 49 provide for the maintenance of an equal distribution of the liquid medium, it also aids in the transfer of heat from the cooking oil to the liquid medium, due to its relatively small diameter. As a matter of fact, in another version the flash boiler tube 45 and 47 could be connected between the heat pipes 41 and 43, thus eliminating the need for conduit 49.

Grill plate 51 is a modified version of grill plate 15, having a chamber or channel structure 53 adapted to distribute the steam or other vaporized medium from the two heat pipes 41 and 43. Of course, further heat pipes could also be employed, which would involve further modification of the grill plate.

The shape of chamber or channel structure 53 is illustrated schematically in FIG. 5. While various shapes could be utilized, the shape of FIG. 5 is that preferred in this embodiment. It should also be recognized that the channel structure is not flat, but is angled to provide for return flow of the condensed medium, as illustrated in FIG. 4.

As may be seen, a pair of openings 55 and 57 communicate with the heat pipes 41 and 43, respectively. Steam, or other vaporized medium, rises through these openings and water, or other condensed liquid medium, flows back to the heat pipes through these openings.

Radiating outwardly from opening 55 are channel branches 59, 61, 63 and 65. Branch 65 also communicates with opening 57, which has additional channel branches 67, 69 and 71 radiating outwardly therefrom. Channel branches 63 and 67 communicate with a larger branch 73, while branches 61 and 71 communicate with a similar larger branch 75.

This arrangement of the branches of the channels of chamber 53 provides for uniform distribution of heat over grill plates 51, without generating unduly excessive pressure forces on the grill plate. Of course, any appropriate shape of the chamber or channel structure 53 that would realize these goals could be utilized.

It should be understood that various modifications, changes and variations may be made in the arrangement, operation and details of construction of the elements disclosed herein without departing from the spirit and scope of this invention.

I claim:

1. A cooking grill for use with deep fat frying containers holding a cooking oil comprising:
   a generally flat grill plate; and
   mounting means to support said grill plate adjacent the top of a deep fat frying container;
   a heat pipe containing a liquid medium and extending from said grill plate into the cooking oil in the deep fat frying container to convey heat from the cooking oil to said grill plate; and
   a flash boiler tube associated with said heat pipe, a first end of said tube being in fluid communication with the interior of said heat pipe at the bottom thereof, and a second end of said tube being in fluid communication with the interior of said heat pipe above said first end.

2. A cooking grill as claimed in claim 1 wherein liquid medium in said heat pipe is water.

3. A cooking grill as claimed in claim 1 and further comprising heat fins attached to said heat pipe increase heat transfer from the cooking oil to said heat pipe.

4. A cooking grill as claimed in claim 1 wherein said grill plate is mounted directly on the top of the deep fat frying container.

5. A cooking grill as claimed in claim 1 and further comprising connecting means on said grill plate to permit said grill plate to be interlocked with another grill plate to form a substantially continuous cooking surface.

6. A cooking grill as claimed in claim 1 and further comprising heat distributing means to evenly spread the heat from said heat pipe over said heat plate.

7. A cooking grill as claimed in claim 6 wherein said distributing means comprises a relatively small diameter channel having branches extending under said grill plate with said branches being in relatively close proximity to the major portion of the area of said grill plate.

8. A cooking drill for use with deep fat frying containers holding a cooking oil comprising:
   a generally flat grill plate;
   mounting means to support said grill plate adjacent the top of a deep fat frying container;
   a heat pipe containing a liquid medium and extending from said grill plate into the cooking oil in the deep fat frying container to convey heat from the cooking oil to said grill plate; and
   a second heat pipe containing the liquid medium, the bottom ends of said heat pipes away from said grill plate being interconnected by a fluid conduit.

9. A cooking grill as claimed in claim 8 and further comprising a flash boiler tube associated with each of said heat pipes, a first end of each of said flash boiler tubes being in fluid communication with the interior of its associated heat pipe at the bottom end thereof, and a second end of each of said flash boiler tubes being in fluid communication with the interior of its associated heat pipe above said first end.

10. A cooking grill for use with deep fat frying containers holding a cooking oil comprising:
    a generally flat grill plate;
    mounting means to support said grill plate adjacent the top of a deep fat frying container;
    a relatively small diameter channel formed in said grill plate below the surface thereof, branches of said channel extending to be in relatively close proximity to a major portion of the surface area of said grill plate;
    at least one heat pipe containing a liquid medium extending from said grill plate into the cooking oil in the deep fat frying container, the heat from the cooking oil vaporizing the liquid medium which is then distributed by said channel to uniformly heat the surface of said grill plate without generating unduly high pressure forces; and
    a flash boiler tube associated with said heat pipe, a first end of said tube being in fluid communication with the interior of said heat pipe at the bottom end thereof, and a second end of said tube being in fluid communication with the interior of said heat pipe at a point above said first end.

11. A cooking grill as claimed in claim 10 wherein:
    at least two heat pipes are connected to said grill plate, each of said heat pipes having its top end in fluid communication with said channel, said heat pipes having a liquid medium in common;
    a flash boiler tube is associated with each of said heat pipes, a first end of each of said tubes being in fluid communication with its associated heat pipe at the bottom thereof, a second end of each of said tubes being in fluid communication with the interior of its associated heat pipe at a point above said first end; and
    the bottoms of said heat pipes are interconnected by a fluid conduit.

12. A cooking grill as claimed in claim 11 wherein the liquid medium is water.

* * * * *